Patented Feb. 15, 1944

2,342,028

UNITED STATES PATENT OFFICE 2,342,028

PRODUCTION OF ORGANIC ACIDS

Carl N. Zellner, Elizabeth, N. J., assignor to Tide Water Associated Oil Company, Bayonne, N. J., a corporation of Delaware No Drawing. Application March 28, 1941, Serial No. 385,691

12 Claims. (Cl. 260—452)

This invention relates to improved methods for the production of useful organic materials, and is more particularly concerned with the separation and recovery of saponifiable material from mixtures containing the same in association with other substances. The invention finds specific application in the separation and recovery of organic acids, particularly soap-forming or "higher" aliphatic fatty acids of useful character from oxidation mixtures resulting from the limited oxidation of hydrocarbons.

In the limited oxidation of hydrocarbons, the starting material, for example a petroleum fraction containing predominantly aliphatic straight chain hydrocarbons, is subjected to oxidation under controlled conditions to produce a mixture containing oxidized hydrocarbon material, such as alcohols, ketones and esters of organic acids which may have from one to as high as thirty or more carbon atoms in association with considerable percentages of unreacted hydrocarbons.

Substances derived from the oxidation of hydrocarbons have been demonstrated to be of value in the various arts. Aliphatic acids derived from limited oxidation of petroleum hydrocarbons have been proposed for conversion to soaps to be used in greases, as emulsifying agents for insecticides and the like, as detergents and for other applications ordinarily employing soaps deriver from vegetable or animal fats or oils, and for use as starting materials in the production of many chemical products.

In view of the relative cheapness of petroleum materials and other naturally occurring hydrocarbon mixtures suitable as starting materials in producing these useful oxidized hydrocarbon substances a commercially feasible method whereby the described products can be economically produced in a satisfactory state of purity is desired. A major object of the present invention is the provision of such a method.

Although considerable research and development work has been conducted in this field, no entirely satisfactory method has been heretofore devised for separation and recovery of useful saponifiable material from the described oxidation or similar mixtures. Each of the methods proposed has been lacking in one or more important virtues; some of these methods are not sufficiently economical for commercial operation because they result in low yields or unavoidable loss of reagents; others result in products of low purity, inferior color or odor.

In one general prior art method, for example, the oxidation mixture is treated with aqueous caustic or the like under conditions effective to cause saponification of the acidic component. The mixture is then allowed to stand whereupon it separates into two layers, on containing the aqueous alkali soaps and the other unsaponified material. The layers are separated and the soap layer is extracted with a solvent capable of dissolving entrained unsaponified material. The soap is then reacted with strong mineral acid to free the organic acids therefrom. A major disadvantage inherent in this method is that metal salts of the mineral acid employed are formed which are of low value, thus resulting in a loss of saponifying agent and mineral acid. Other disadvantages include discoloration of the organic acid as a result of the mineral acid treatment.

Another proposed general method involves use of solvents instead of alkali. According to this method the oxidation mixture is extracted with volatile solvents capable of dissolving the acids but having a lower solvent power for the unoxidized component of the structure. For example, pyridine has been proposed as a solvent in such a process. The extract is then treated with a second solvent to remove the unoxidized materials therefrom, and finally the volatile solvent is distilled from the acids. This method is uneconomical and inefficient, it having been found that the stated treatment of the extract to remove unsaponifiable material also removes considerable proportions of the saponifiable material, thus resulting in low yields of the final product.

According to the present invention there is provided a simple, effective and relatively economical method for separating or recovering saponifiable constituents from unsaponifiable material originally associated therewith, as for example in a mixture resulting from the limited oxidation of predominantly aliphatic hydrocarbons. By means of the invention higher yields of superior products are obtained with substantially no loss of reagents and with elimination of other difficulties inherent in methods heretofore proposed. The invention represents a real advance in the art by providing a means whereby petroleum and other low cost hydrocarbon source materials can be utilized to produce relatively pure organic acids of desirable properties for use in the various arts, in an economical and otherwise satisfactory manner.

These results are obtained in the invention by a novel process which broadly comprises treating mixtures containing saponifiable and unsaponifiable materials with certain basic reagents of particular characteristics, under conditions effective to bring about reaction between such reagent and the saponifiable material of the mixture, separating the reaction products from the non-saponifiable material and dissociating the reaction products with direct separate recovery of the desirable saponifiable material and the basic reagent.

In broad aspect the invention comprises a series of steps or operations forming a novel method and the use in such method of certain cyclic ether amines as the basic reagents. More specifically, the series of steps or operations constituting the method of the invention comprises treating a mixture containing fatty acids and hydrocarbons, such as the oxidation mixture resulting from limited oxidation of hydrocarbons, with a suitable cyclic ether amine to form with the acidic components amine reaction products. The resulting mass is then allowed to stand, whereupon two layers form, one containing the major portion of the hydrocarbons and the other the amine reaction products with some entrained hydrocarbons. The layers are then separated and the layer containing the amine reaction products is extracted with a hydrocarbon solvent to remove the entrained hydrocarbons. The raffinate containing the amine reaction products is then distilled to dissociate the same with recovery of the amine and free fatty acids separately.

The effective operation of this method depends primarily upon use of suitable reagents for reaction with the acidic components of the mixture. Such reagents must be immiscible or of low miscibility with the hydrocarbons present. They must be sufficiently basic as to form reaction products with the acidic components, and such reaction products must be of low miscibility or immiscible with the hydrocarbons and should form distinct and separable layers with a minimum of emulsification. Said reaction products must be of minimum solubility in hydrocarbon solvents employed in extracting entrained hydrocarbons therefrom as stated in order to insure high yields of fatty acids in the process. The basic reagent must be of a different volatility than that of the acids being produced in order that the basic reagent and acids may be separately recovered by distillation. Finally the basic reagent used must not react under the conditions of the process to form products not dissociatable by distillation.

I have discovered that compounds from the class of ether amines fulfill the stated requirements and are admirably suited for use according to the invention. Cyclic ether amines are structurally characterized by an amino group, the nitrogen atom of which is situated in a cyclic hydrocarbon ring which also contains an ether linkage. Cyclic ether amines which I have found particularly desirable for use in this invention are morpholine and certain derivatives thereof. Alkylol derivatives of morpholine are especially effective. Examples of the latter are morpholine ethanol and certain derivatives and homologues thereof. Other cyclic ether amines of this class are morpholine alkanol ethers such as morpholine ethanol vinyl ethers, morpholine ethanol ethyl ethers, morpholine methanol butyl ethers, morpholine methanol cyclohexyl ethers, morpholine methanol cetyl ethers, and the like. Cyclic ether amines other than those containing the morpholine nucleus are also included, an example being the reaction products produced by reacting ethanol amine with acetyl acetone, having the following formula:

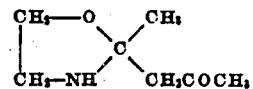

The compounds indicated which are adapted for use in the invention possess properties and characteristics making them particularly desirable for the separation of aliphatic organic acids from mixtures containing the same associated with hydrocarbons, such, for example, as oxidation mixtures resulting from the limited oxidation of paraffin wax and other aliphatic hydrocarbons. These compounds are substantially immiscible with hydrocarbons such as molten wax; their soaps are water-soluble and are not decomposed to an objectionable extent when extracted with naphtha or other hydrocarbon solvent in the extraction step referred to; their volatility is greater than that of the organic acids desired to produce so that separation from their soaps by distillation is possible; and they do not form amides or other extraneous reaction products upon distillation under atmospheric conditions or at higher distillation temperatures, or during any other stage of the processes. Thus, by simple distillation substantially all of the acid and amine reactants of the reaction product are recovered.

The process thus has the economic advantage over stated prior art methods employing caustic and similar metal alkalies wherein loss of considerable amounts of mineral acids and caustic in the form of metal salts occurs. Likewise, special equipment necessary for the handling and use of mineral acids is unnecessary in the process of the invention, and difficulties inherent in control and operation of the chemical reaction between the alkali soaps and mineral acids, danger of impairment of the color and other properties of the desired products due to use of mineral acids are avoided.

Methods have been heretofore proposed for production of saponifiable material by treating hydrocarbon oxidation mixtures with ammonia and the like and subsequently distilling the ammonium reaction products by steam distillation. However, the resulting distillation residues contain considerable proportions of nitrogenous compounds such as acid amides, removal of which requires additional treatment as with mineral acid, thus increasing the cost of the process. I am also aware of the proposal to separate certain alkanolamines from their soaps by distillation of the latter. Here, also, the amines concerned are of amide forming character, and additional and complicating steps must be employed to lessen amidization. No such added steps or precautions are needed in the process of the present invention.

I am also familiar with methods of isolating naphthenic acids from such petroleum fractions as gas oil, for example as set forth in U. S. Patent No. 2,186,249. In such methods the major problem is to free the naphthenic acids from undesirable constituents such as phenols. The process of the stated patent comprises treating gas oil with ammonia or certain amines to produce an aqueous soap layer and an oily layer containing the phenols. The layers are separated and the aqueous soap layer is distilled to drive off the ammonia or amino compound. The distillation residue containing the naphthenic acids also contains large proportions of hydrocarbons, the latter being removable by a subsequent distillation. This patented process is obviously not applicable to the separation of fatty acids from oxidation mixtures and the like since such mixtures, as distinguished from gas oil, contain fatty acids and hydrocarbons of substantially the same volatility which cannot be separated from one another by distillation.

It should be clear from the above discussion that the effectiveness of the invention depends upon the use of agents having unique and particular properties and characteristics, and upon the discovery that said agents could be employed in conjunction with the procedure outlined and discussed herein to produce the results attained.

The following examples represent illustrative embodiments of the invention as applied to the oxidation mixtures produced by liquid phase air oxidation of certain petroleum fractions and materials of low cost. The starting materials may be various by-products of petroleum refining of little or no value as fuels or lubricants or substances ordinarily considered as refinery waste. Suitable materials include scale wax and other waxy products, petrolatum, gas oils, and the like. The range of acids obtainable depends upon the range of hydrocarbons present in the starting material. In general mixtures of organic acids having various numbers of carbon atoms up to about thirty are obtainable when using as starting materials the materials indicated above. Fractions consisting of fatty acids having 12 to 18 carbon atoms of very light color and high purity have been prepared by the method of the invention using as starting material scale wax having a melting range of 105° F. to 108° F.

Example I

A petroleum fraction high in paraffinic hydrocarbons melting at about 90° F. is oxidized by passing air through the liquified material in the presence of a manganese naphthenate catalyst, the temperature during treatment being roughly 110° C. The effluent gases evolved from the oxidizer were passed through a water scrubber, then a condenser, and then a second water scrubber. This procedure removes water-soluble oxidation products such as low-boiling acids and alcohols. These materials may be returned to the oxidizer or removed from the process, as desired. The oxidation is continued in this manner for a number of hours until the desired saponification value of the bottoms remaining in the oxidation vessel is reached, whereupon the bottoms are removed from the oxidizing vessel and treated in the following manner:

50 parts by volume of the bottoms material which contains high-boiling saponifiable oxidized compounds and unsaponifiable material comprising largely unoxidized wax were treated warm with 7 parts by volume of morpholine and 10 parts by volume of water. Upon standing, two layers formed, the lower layer comprising an aqueous solution of morpholine soaps and entrained unoxidized hydrocarbons and the upper layer comprising mainly unoxidized hydrocarbons and traces of uncombined morpholine. The layers were separated from each other and the upper layer washed with water to remove the uncombined morpholine therefrom, the water washings then being added to the lower layer and the remaining portion of the upper layer recycled to the oxidation step.

The lower layer was then extracted with benzol to remove entrained hydrocarbon material therefrom, leaving the morpholine soaps in water solution substantially free from unoxidized hydrocarbon materials.

The morpholine soap solution was then decomposed by heating in a suitable still to separate the morpholine, the latter being collected as distillate. A desirable procedure is to distill off the bulk of the morpholine at atmospheric pressure and to remove the remainder by distillation under reduced pressure.

The acidic material remaining in the still showed by test a saponification value of 230.72 mg. of KOH/gm. This material contained no amides and can be readily fractionated to produce various fractions of desired organic acids.

Instead of removing the low-boiling material as effluent condensate, as stated above, other methods may be used. For example, this material may be allowed to remain in the still, then the whole oxidation mixture water-washed, or topped at suitable temperature, in order to remove the water-soluble constituents prior to addition of amine.

Example II 110 parts by volume of the bottoms containing oxidized hydrocarbons and unoxidized hydrocarbons resulting from liquid phase oxidation of paraffine wax in the general manner described in Example I, and having a saponification value of 79.52 mg. of KOH/gm., were mixed with 25 parts by volume of morpholine ethanol and 75 parts by volume of water and the resulting mixture shaken warm. The two layers which formed on standing were separated and treated as in Example I hereinabove, except that in this case the soap layer was extracted with naphtha to remove unsaponified material instead of using the benzol extraction of Example I. This extracted matter, after distilling off the naphtha, was recycled to the oxidizing step.

The morpholine ethanol soap was distilled under vacuum of 20 mm. of Hg, the distillate temperature being 120° C. at the start and 150° C. at the end of the distillation. 13 parts by volume of acidic material containing no amides were contained in the residue. Substantially all of the morpholine ethanol was recovered as distillate for reuse.

The residue was fractionally distilled. A fraction of light colored acids boiling at 140°–200° C. at 3 mm. of Hg pressure and having a saponification value of 216.72 mg. of KOH/gm. was obtained.

The invention is not to be considered as limited to the specific procedure used in the above illustrative examples. For instance, while in the examples water is employed in somewhat large proportions, lesser proportions may be used, or if desired the method can be operated without addition of water. Ordinarily the use of water is desirable to effect more clear-cut separation of the layers of saponified and unsaponified material when treating oxidation mixtures containing appreciable proportions of hydroxy compounds. When treating mixtures of organic acids and hydrocarbons containing less or no hydroxy compounds, proportionately less or no water is required to effect good stratification. In such cases the distillation time is accordingly shortened. Also, the particular distillation conditions set forth are not limitative. For instance, in certain cases the distillation may be conducted entirely at atmospheric pressure without formation of amides. Likewise, in place of water other diluents or solvents may be employed in the amine treatment in order to effect good stratification and other desirable results. Regarding the proportion of amines used, it is generally desirable to employ an excess of amine over the stoichiometrical amount necessary to react with the acidic material present.

I claim:

1. In the production of organic substances by the limited oxidation of hydrocarbons resulting in an oxidation mixture containing both acidic material and hydrocarbons, the method of recovering acids from said oxidation mixture comprising treating said mixture with a cyclic ether amine to form with the acid material cyclic ether amine reaction products, separating said reaction products by heating from said hydrocarbons, and dissociating said reaction products to separately recover said amine and said acidic material.

2. In the production of organic substances by the limited oxidation of hydrocarbons resulting in an oxidation mixture containing both organic acids and hydrocarbons, the method of recovering acids substantially free from hydrocarbons from said oxidation mixture comprising treating said mixture with a cyclic ether amine having a volatility differing from that of the organic acids to form with the said acids cyclic ether amine reaction products, separating said reaction products from said hydrocarbons and dissociating said reaction products by distillation to separately recover organic acids and cyclic ether amine.

3. In the production of high-boiling aliphatic acids by the limited oxidation of hydrocarbons resulting in an oxidation mixture containing low-boiling and high-boiling organic acids and unreacted hydrocarbons, the method of recovering high-boiling organic acids from said oxidation mixture in substantially pure form comprising removing said low-boiling acids, treating the remaining mixture with a cyclic ether amine of higher volatility than that of the high-boiling acids to form with said high-boiling acids amine reaction products, separating said reaction products from said hydrocarbons and dissociating said reaction products by distillation to separately recover said high-boiling acids and said amine.

4. Method for separating aliphatic acids from mixtures containing the same in association with hydrocarbon materials which comprises treating said mixture with a cyclic ether amine having a volatility higher than that of said acids, adding an aqueous material to form with said acids amine reaction products in aqueous solution, said solution containing some entrained hydrocarbons but being readily separable from the bulk of the hydrocarbons, separating the bulk of the hydrocarbons, removing the said entrained hydrocarbons from the said reaction product solution and then dissociating the said amine reaction products by distillation to separately recover the aliphatic acids and amine.

5. Method for separating aliphatic acids from mixtures containing the same in association with hydrocarbon materials which comprises treating said mixture with a cyclic ether amine and adding an aqueous material to form with said acids amine reaction products in aqueous solution, said solution containing some entrained hydrocarbons but being readily separable from the bulk of the hydrocarbons, separating the bulk of the hydrocarbons, extracting the said entrained hydrocarbons from said reaction product solution by means of a hydrocarbon solvent and dissociating the said amine reaction products to separately recover aliphatic acids and amine.

6. Method for producing relatively pure aliphatic organic acids from hydrocarbon oxidation mixtures containing the same in association with hydrocarbons which comprises treating said mixture with a water-soluble cyclic ether amine of a volatility higher than that of said acids to form with said acids amine reaction products, the amount of said cyclic ether amine being in excess of the stoichiometrical proportion whereby to produce a first component containing said amine reaction products and entrained hydrocarbons and a second component containing the bulk of the hydrocarbons and excess cyclic ether amine, separating the two components, washing the second component with an aqueous material to dissolve out the cyclic ether amine, adding the washings to the first component, extracting from the first component the entrained hydrocarbons and dissociating the amine reaction products by distillation to separately recover aliphatic acids and amine.

7. Method according to claim 1, in which the cyclic ether amine is morpholine.

8. Method according to claim 1, in which the cyclic ether amine is morpholine ethanol.

9. Method according to claim 2, in which the cyclic ether amine is morpholine.

10. Method according to claim 2, in which the cyclic ether amine is morpholine ethanol.

11. Method according to claim 4, in which the cyclic ether amine is morpholine.

12. Method according to claim 4, in which the cyclic ether amine is morpholine ethanol.

CARL N. ZELLNER.

CERTIFICATE OF CORRECTION.

Patent No. 2,342,028.　　　　　　　　　　　　　　February 15, 1944.

CARL N. ZELLNER.

It is hereby certified that error appears in the printed specification of the above numbered patent requiring correction as follows: Page 1, first column, line 29-30, for "deriver" read --derived--; page 4, first column, line 17, claim 1, after "products" strike out "by heating" and insert the same before "to", line 19, same claim; and that the said Letters Patent should be read with this correction therein that the same may conform to the record of the case in the Patent Office.

Signed and sealed this 9th day of May, A. D. 1944.

Leslie Frazer

(Seal)　　　　　　　　　　　　　　Acting Commissioner of Patents.